ically, novel hydrazone compounds of the present invention are
United States Patent Office 3,732,262
Patented May 8, 1973

---

3,732,262
10-HYDRAZONO-3,7-DIALKYL-2,6-DECADIENOATES
Clive A. Henrick and John B. Siddall, Palo Alto, Calif.,
assignors to Zoecon Corporation, Palo Alto, Calif.
No Drawing. Filed May 12, 1971, Ser. No. 142,818
Int. Cl. C07c 109/14, 69/66; A01n 9/20
U.S. Cl. 260—404.5
11 Claims

ABSTRACT OF THE DISCLOSURE

Novel hydrazono compounds prepared by the reaction of a hydrazine with an aliphatic unsaturated aldehyde which are useful for the control of insects.

---

This invention relates to novel hydrazones and the preparation and use of the compounds. More particularly, novel hydrazone compounds of the present invention are represented by the following Formula A:

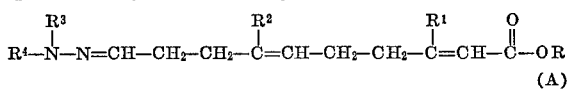

wherein,
R is lower alkyl, cycloalkyl, aralkyl or aryl;
each of $R^1$ and $R^2$ is lower alkyl;
$R^3$ is hydrogen or lower alkyl; and
$R^4$ is lower alkyl or phenyl.

The term "lower alkyl," as used herein, refers to an alkyl group, straight or branched, having a chain length of one to six carbon atoms. The term "cycloalkyl," as used herein, refers to a cyclic alkyl group of four to eight carbon atoms. The term "aralkyl," as used herein, refers to a monovalent group of seven to twelve carbon atoms in which an aryl group is substituted for a hydrocarbon atom of an alkyl group, such as benzyl, xylyl, mesityl, phenylethyl, methylbenzyl, naphthylmethyl and napthylethyl. The term "aryl," as used herein, refers to monovalent aryl group of six to twelve carbons, such as phenyl and naphthyl.

The compounds of Formula A are useful insect control agents. For application, the insect control agents of the present invention are applied using a suitable carrier substance, liquid or solid, such as talc, silica, cellulose, synthetic and natural resins, water, acetone, xylene and mineral and vegetable oils. Generally, a formulation will contain less than 95% of the insect control agent and more frequently less than 25%. Sufficient application should be made to provide from about 0.1 to 50 micrograms of insect control agent per insect based upon the estimated population. Typical insects which can be controlled by the present invention are members of Diptera, Coleoptera, Homoptera, Hemiptera, Lepidopteran and Orthoptera, such as mosquitos, aphids, beetles, moths, roaches and graphasoma. Preferably, the insect control agent is applied to the immature insect at the embryo, larvae or pupae stage. Without any intention of being bound by theory, the insect control agents of the present invention, unlike conventional insecticides, are believed to be effective control agents by disrupting normal metamorphic development resulting in abnormal development and, in some cases, sterility and inability to reproduce.

The compounds of Formula A are prepared according to the following outlined synthesis:

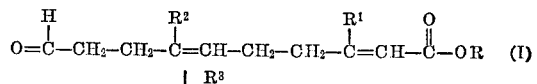

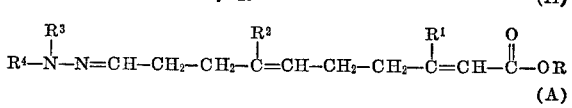

In the practice of the above outline synthesis, an aldehyde of Formula I is reacted with hydrazine of Formula II to yield the hydrazone compound of Formula A. In carrying out the reaction, an excess of the hydrazine (II) is used. The reaction can be done neat or in the presence of an organic solvent, such as the lower monohydric alcohols. In order to speed up the reaction, a trace of an acid can be used to catalyze the reaction. The reaction can be carried out from about room temperature to reflux and is usually complete within a few minutes to several hours.

The precursors of Formula I can be prepared as described in copending application Ser. No. 73,599, filed Sept. 18, 1970, the disclosure of which is incorporated by reference.

The following examples are provided to illustrate the present invention. Temperature is given in degrees centigrade.

EXAMPLE 1

A mixture of 22 g. of methyl 9-carbonyl-3,7-dimethylnona-2,6-dienoate and 9.6 g. of isopropyl hydrazine (98%) is prepared and then allowed to stand overnight at room temperature. Then excess hydrazine is removed by evaporation under reduced pressure. The crude hydrazone product is purified by column chromatography to yield methyl 10-isopropylhydrazono-3,7-dimethyldeca-2,6-dienoate.

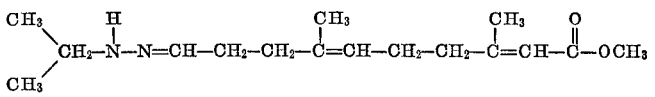

EXAMPLE 2

To a mixture of 2.2 g. of methyl 9-carbonyl-3,7-dimethylnona-2,6-dienoate and 1.7 g. of methylhydrazine is added one ml. of acetic acid. The mixture is allowed to stand for about 16 hours and then excess methyl hydrazine is removed by evaporation under reduced pressure. The crude product is purified by chromatography to yield methyl 9 - methylhydrazono - 3,7 - dimethyldeca-2,6-dienoate.

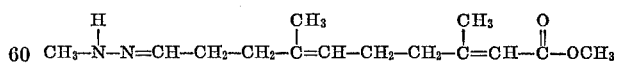

The process of this example is repeated using dimethylhydrazine in place of methyl hydrazine to prepare methyl 10-dimethylhydrazono-3,7 dimethyldeca-2,6-dienoate.

EXAMPLE 3

A mixture of 2.2 g. of methyl 9-carbonyl-3,7-dimethylnona-2,6-dienoate, 1.8 g. of ethylhydrazine and 10 ml. of dry methanol is prepared and then allowed to stand for about 18 hours at room temperature. Then the mixture is concentrated by evaporation under reduced pressure and the concentrate purified by chromatography to yield methyl 10-ethylhydrazono-3,7-dimethyldeca-2,6-dienoate.

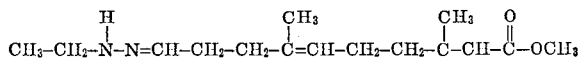

EXAMPLE 4

By following the procedure of Example 1, 2, or 3, methyl hydrazine is reacted with each of:

ethyl 9-carbonyl-3,7-dimethylnona-2,6-dienoate,
isopropyl 9-carbonyl-3,7-dimethylnona-2,6-dienoate,
benzyl 9-carbonyl-3,7-dimethylnona-2,6-dienoate,
cyclohexyl 9carbonyl-3,7-dimethylnona-2,6-dienoate,
methyl 9-carbonyl-3-methyl-7-ethylnona-2,6-dienoate, and
ethyl 9-carbonyl-3-methyl-7-ethylnona-2;6-dienoate to prepare:

ethyl 10-methylhydrazono-3,7-dimethyldeca-2,6-dienoate,
isopropyl 10-methylhydrazono-3, 7-dimethyldeca-2,6-dienoate,
benzyl 10-methylhydrazono-3,7-dimethyldeca-2,6-dienoate,
cyclohexyl 10-methylhydrazono-3,7-dimethyldeca-2,6-dienoate,
methyl 10-methylhydrazono-3-methyl-7-ethyldeca-2,6-dienoate, and
ethyl 10-methylhydrazono-3-methyl-7-ethyldeca-2,6-dienoate, respectively.

Similarly, by reacting each of ethyl hydrazine, dimethylhydrazine and diethylhydrazine with each of the aldehydes enumerated in the preceding paragraph, the respective 10-ethylhydrazono, 10-dimethylhydrazono and 10-diethylhydrazono derivatives are prepared, e.g., ethyl 10-ethylhydrazono-3,7-dimethyldeca-2,6-dienoate,
ethyl 10-dimethylhydrazono-3,7-dimethyldeca-2,6-dienoate,
ethyl 10-diethylhydrazono-3,7-dimethyldeca-2,6-dianoate,
isopropyl 10-ethylhydrazono-3,7-dimethyldeca-2,6-dienoate, etc.

EXAMPLE 5

By use of the process of Example 1, 2 or 3, phenylhydrazine is reacted with each of methyl 9-carbonyl-3,7-dimethylnona-2,6-dienoate, ethyl 9-carbonyl-3,7-dimethylnona-2,6-dienoate, methyl 9-carbonyl-3-methyl-7-ethylnona-2,6-dienoate, and methyl 9-carbonyl-3,7-diethylnona-2,6-dienoate to prepare methyl 10-phenylhydrazono-3,7-dimethyldeca-2,6-dienoate, ethyl 10-phenylhydrazono-3,7-dimethyldeca-2,6-dienoate, methyl 10-phenylhydrazono-3-methyl-7-ethyldeca-2,6-dienoate, and methyl 10-phenylhydrazono-3,7-diethyldeca-2,6-dienoate, respectively.

What is claimed is:

1. A compound selected from those of the following Formula A:

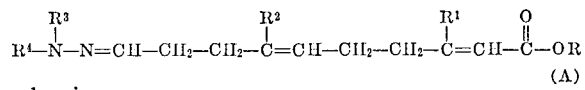

wherein,

R is lower alkyl, cycloalkyl, aralkyl or aryl;
each of $R^1$ and $R^2$ is lower alkyl;
$R^3$ is hydrogen or lower alkyl; and
$R^4$ is lower alkyl or phenyl.

2. A compound according to claim 1 wherein each of $R^1$ and $R^2$ is methyl or ethyl and R is lower alkyl.

3. A compound according to claim 2 wherein $R^1$ is methyl, $R^3$ is hydrogen or lower alkyl and $R^4$ is lower alkyl.

4. A compound according to claim 3 wherein $R^3$ is hydrogen.

5. A compound according to claim 4 wherein $R^4$ is methyl or ethyl.

6. A compound according to claim 3 wherein each of $R^3$ and $R^4$ is methyl or ethyl.

7. A compound according to claim 5 wherein R is methyl, ethyl or isopropyl.

8. A compound according to claim 6 wherein R is methyl, ethyl or isopropyl.

9. A compound according to claim 1 wherein R is lower alkyl; $R^1$ is methyl; $R^2$ is methyl or ethyl; $R^3$ is hydrogen; and $R^4$ is phenyl.

10. A compound according to claim 9 wherein R is methyl or ethyl.

11. The compound, ethyl 10-dimethylhydrazono-3,7-dimethyldeca-2,6-dienoate, according to claim 8.

References Cited

Meinwald et al.: Tetrahedron Letters, No. 47, pp. 4893–96 (1968).

LEWIS GOTTS, Primary Examiner

D. G. RIVERS, Assistant Examiner

U.S. Cl. X.R.

260—410.9 R; 424—312, DIG. 12, 309